United States Patent [19]

Guienne

[11] 4,096,921
[45] Jun. 27, 1978

[54] VEHICLE SUPPORTED BY AN AIR CUSHION

[76] Inventor: Paul Francois Guienne, 5, rue de Bagatelle, Neuilly, France, 92200

[21] Appl. No.: 805,526

[22] Filed: Jun. 10, 1977

[51] Int. Cl.² .......................... B60V 1/04; B60V 1/16
[52] U.S. Cl. ..................................... 180/121; 180/128
[58] Field of Search ............................... 180/117–129; 114/67 A

[56] References Cited

U.S. PATENT DOCUMENTS

| | | | |
|---|---|---|---|
| 3,319,592 | 5/1967 | Hunt | 180/127 X |
| 3,382,945 | 5/1968 | Bertin et al. | 180/121 |
| 3,401,767 | 9/1968 | Barr | 180/121 |
| 3,513,933 | 5/1970 | Faure | 180/127 |
| 3,550,718 | 12/1970 | Knuth | 180/121 |
| 3,746,116 | 7/1973 | Schwingshandl | 180/121 |
| 3,777,842 | 12/1973 | Laufman | 180/117 |
| 3,840,089 | 10/1974 | Allison | 180/116 |

FOREIGN PATENT DOCUMENTS 1,165,732 10/1969 United Kingdom .................. 180/125

Primary Examiner—Kenneth H. Betts
Attorney, Agent, or Firm—Laurence R. Brown

[57] ABSTRACT

A vehicle supported by an air cushion extending beneath at least the greater part of the lower surface of the rigid structure of the vehicle. An arrangement of skirts defining the air cushions is described. According to this arrangement, the cushion is bounded on each side of the axis of the vehicle by two parallel skirts, a peripheral skirt and an inner skirt, inclined towards the inside of the vehicle defining between them a series of auxiliary air cushions separated by transverse partitions which form skirts inclined towards the rear. The bottoms of the auxiliary cushions are formed by articulated perforated plates. The edges of the plates are connected to the rigid structure by flexible walls forming a flexible volume connected to the supply of air under pressure for the inner cushion.

10 Claims, 6 Drawing Figures

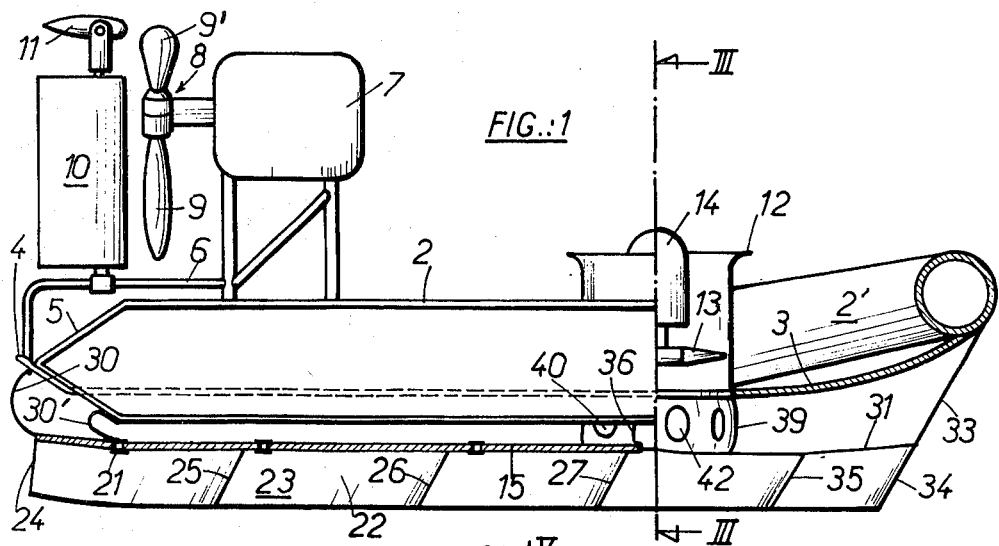
FIG.:1
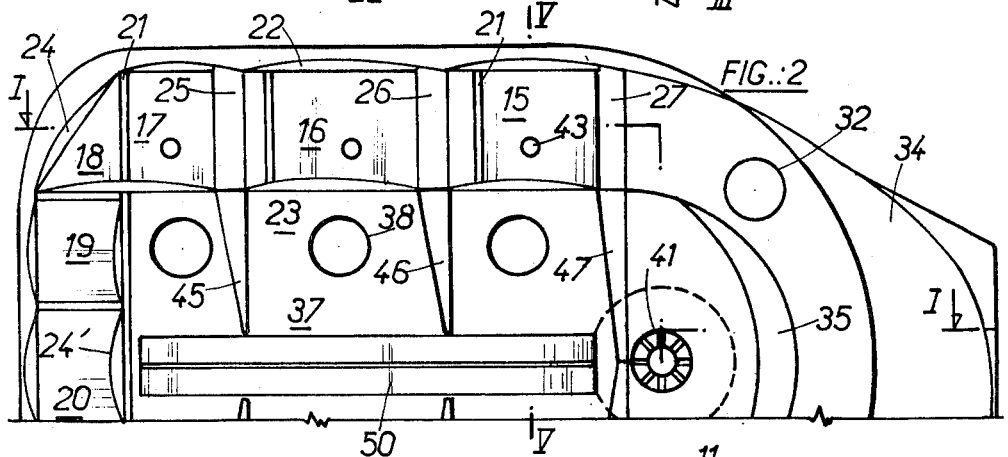
FIG.:2
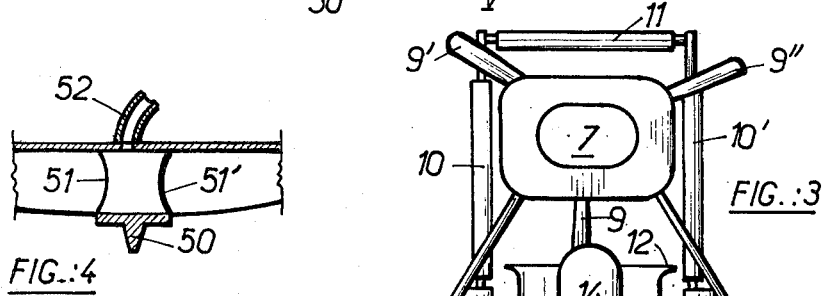
FIG.:4
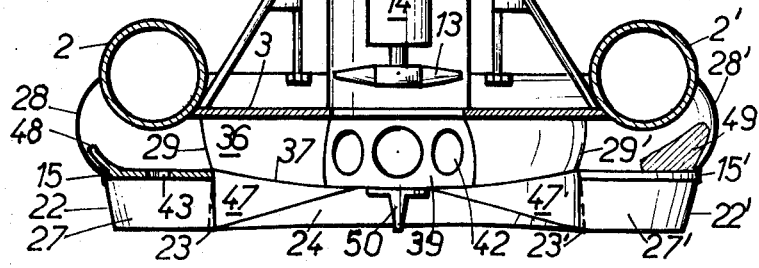
FIG.:3

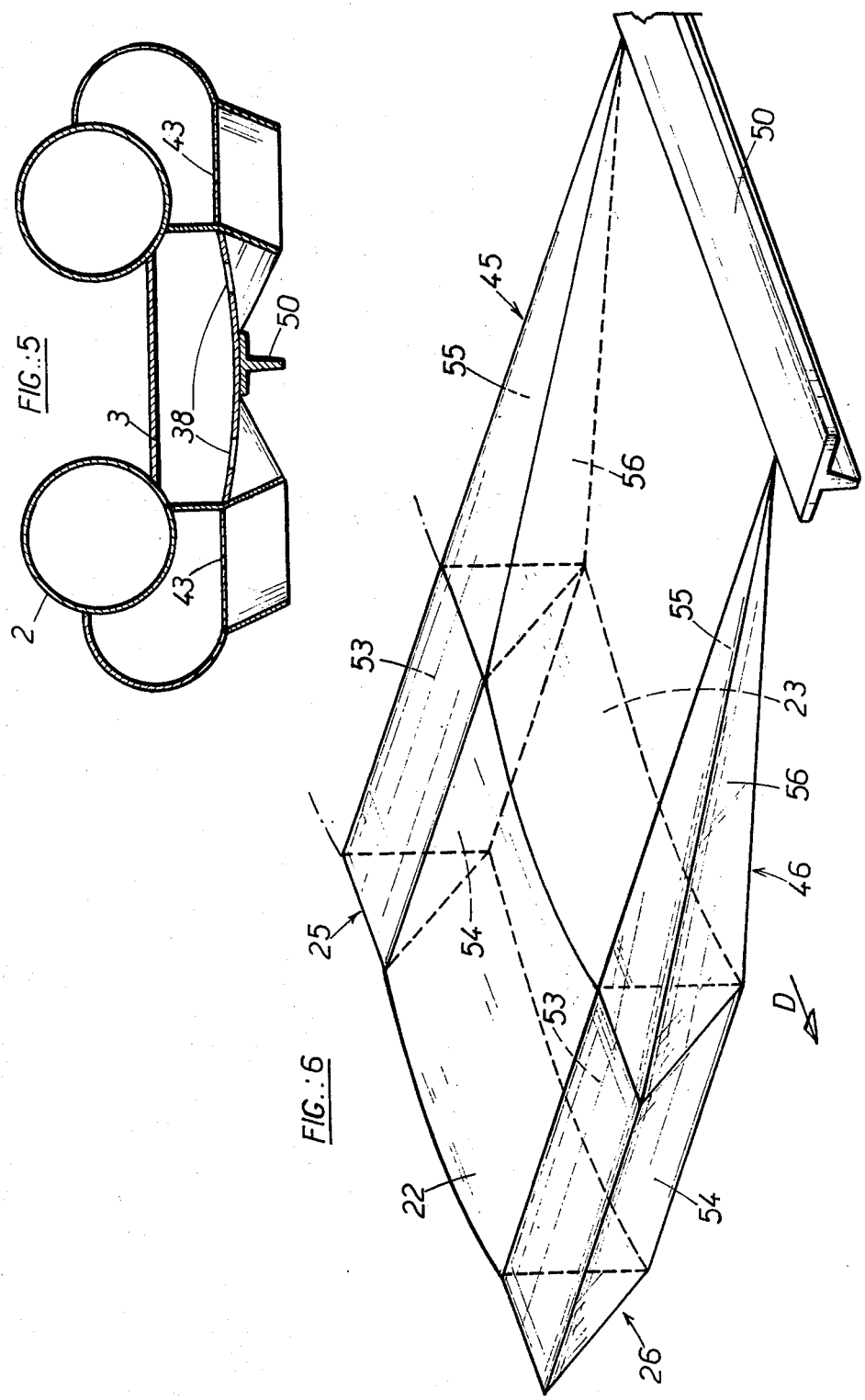

VEHICLE SUPPORTED BY AN AIR CUSHION

The object of the invention is a vehicle supported by a cushion of air, the said cushion extending beneath at least the greater portion of the lower surface of the rigid structure of the vehicle.

British Pat. No. 1 165 732 shows a land vehicle supported by a cushion of air. This vehicle comprises four cushions. Each cushion is constituted by a chamber formed by the rigid chassis of the vehicle, by a flexible wall maintaining the skirt carrier structure level bearing either openings disposed at the edge of the structure or a central opening. The edges of the cushion are provided with a flexible skirt directed inwards forming a single volume. According to one embodiment described, the base is formed of a plurality of elements connected to one another by articulations the axes of which are parallel to the direction of movement of the vehicle.

French Pat. No. 1 541 013 shows a marine vehicle supported by cushions of air. A rigid skirt carrier structure is connected by a flexible envelope to the chassis of the vehicle. The skirt carrier structure supports two concentric flexible skirts surrounding the vehicle and directed towards the centre as well as openings for supplying air to the space between the two skirts and a distribution grid for supplying the space defined by the inner skirt.

Finally, U.S. Pat. No. 3 401 767 shows a land transport means utilising air cushion modules. Each basic module is constituted by a rigid chassis which is surrounded by a flexible peripheral skirt. An opening in the chassis enables the module to be connected to a source of air so as to create a levitation effect. The modules are disposed alongside one another and are coupled to a module supplying the air by means of chains or cables. According to one embodiment, the group of modules is disposed beneath a rigid platform through the agency of flexible cushions filled with air which enables loads to be moved over uneven terrain.

Due to the shape of the skirts and their orientation with respect to the direction of movement of the vehicle, they produce a relatively high drag when they encounter the ground or waves. The object of the invention is a transport vehicle of low power in which the method of arranging the skirts permits a substantial reduction of drag.

The vehicle according to the invention, supported by a cushion of air extending beneath at least the greater part of the lower surface of the rigid structure of the vehicle, is noteworthy in that the said cushion is bounded on each side of the axis of the vehicle by two parallel skirts, a peripheral skirt and an inner skirt, inclined towards the inside of the vehicle, defining between them a row of auxiliary air cushions separated by transverse partitions which form skirts inclined towards the rear, the bottom of these auxiliary air cushions being formed by perforated plates articulated to one another, rigid or flexible, the edges of the said plates are connected to the rigid structure by flexible walls forming a resilient volume connected to the compressed air supply for the inner cushion.

The explanations and Figures given hereafter by way of example will enable the manner in which the invention may be carried into effect to be well understood.

FIG. 1 is a section in elevation according to the line I—I in FIG. 2 of a marine vehicle in accordance with the invention.

FIG. 2 is a limited view from below in the neighbourhood of the longitudinal central plane of symmetry.

FIG. 3 is a transverse section according to the line III—III in FIG. 1.

FIG. 4 is a detail of a device for raising the drift.

FIG. 5 is a transverse section corresponding to the level V—V in FIG. 2 in a vehicle comprising flexible plates.

FIG. 6 is a perspective view of a part of the partitioned skirts in accordance with a second embodiment.

The hovercraft represented in FIG. 1 comprises a pneumatic boat structure constituted essentially by inflatable cylinders 2 and 2' called buoys, and which form the lateral edges converging towards the front, as well as a rigid flooring 3.

This structure is closed by a rear plate 4 which overlaps the rear points 5 of the buoys whilst being connected to the latter. The flooring 3 and the plate 4 support a tubular frame 6 which supports on the one hand an engine 7 provided with a propellar 8 having three blades 9, 9', 9'', on the other hand rudders 10, 10' and elevators 11 arranged behind the propeller 8 within the slipstream of the latter and controlled by the pilot by known means (not illustrated).

The engine 7 is preferably a light automobile engine having a power for example of 30 kilowatt.

The flooring 3 is provided with an opening the periphery of which supports the fairing 12 for a fan 13 operated by a second engine 14 which is preferably of the fixed type, for example a rotary piston engine, having a power of 10 kilowatt.

The fact that the lower portion of the structure contributes to the defining of the passages for the distribution of the air issuing from the fan towards the cushions, provides the advantage among others of making the position of the fan 13 unimportant. In the example shown, the fan is situated towards the front so as to assist in balancing the mass of the engine 7.

Movable plates forming a continuous series of elements such as 15, 16, 17, 18, 19, 20 articulated to each other, for example by sheet metal hinges such as 21, receive the four flexible side skirts 22, 23, and 22', 23' parallel to the direction of travel as well as the transverse rear skirt 24 and the transverse flexible partitions such as 25, 26, 27, 27' which will be described further on.

These plates are themselves connected to the structure by outer 28 and 28', inner 29 and 29' and rear 30 flexible suspension walls and form a flexible volume. The side plates such as 15, 16, 17, 18, define with the walls such as 28 and 29 and with the buoy such as 2, side passages which can distribute simultaneously the air issuing from the fan. Due to the pressure of the air, these passages constitute kinds of pneumatic springs ensuring the mean flexibility and the stability of position of the plates as well as the attitude, by a system of differential pressure regulation which will be indicated further on.

The two plates 15 and 15' are extended towards the front by a flexible fabric 31 which may be permeable or include orifices for the passage of air, such as 32, and which form substantially a semi-circular surface below the entire front of the hovercraft. This fabric 31 is connected to the structure by a flexible transverse suspension wall 36 which is connected to the inner walls 29 and 29' and by a flexible suspension wall 33 in the form of a conical portion which is stuck to the front of the buoys and it receives two prow skirts 34 and 35 in the form of half truncated circular cones substantially concentric connected respectively to the side skirts 22, 22' and 23, 23'. Similarly, the wall 33 is connected to the walls 28 and 28'. It will be pointed out that the skirts and walls have been shown inflated as they are during normal travel.

According to one embodiment (not shown) the movable plates forming a continuous series of elements are constituted by one or a plurality of flexible elements. FIG. 5 shows an embodiment in which the plates are replaced by a fabric in which has been provided passages 43. The disposition of the transverse partitions being the same as in the case of the rigid plates, the auxiliary cushions will retain the same references.

The cushions of air are bounded by a double enclosure (FIGS. 2 and 3) constituted by an endless peripheral flexible skirt formed of elements 22, 24, 22' and 34, which follow substantially the outer contour of the structure and by an inner skirt situated almost parallel to the peripheral skirt formed from elements 23, 23', 35 and 24' at the rear, which join the inner side skirts 23 and 23'. The assembly of air cushions is suspended on the structure by a flexible endless peripheral suspension wall constituted by elements 28, 30, 28' and 33 and by two inner side elements 29 and 29' which join at the rear, fluidtight, a rear wall 30'. The suspension forces due to the excess pressure of the air issuing from the fan are the resultant of tensions in the suspension walls and pressures on the movable plates and possibly on the fabric 31 and on the fabric 37 described hereafter.

According to one characteristic of the invention, the transverse flexible partitions such as 25, 26, 27 (FIG. 1) are inclined, at least at their lower part, towards the rear so that in addition to their function of defining independent auxiliary cushions substantially beneath each of the movable side plates 15, 16, 17, 18 and of maintaining the side skirts such as 23 and 22 transverse, they would have a lift with regard to an obstacle or a wave which would tend to raise all the elements to which each of them is fixed.

According to one embodiment (not shown) only the lower end of the partitions is inclined towards the rear.

The same inclined disposition and the same lift effect characterise retaining webs (FIG. 2) such as 45, 46 and 47 which extend respectively the partitions 25, 26 and 27 up to the central axis of symmetry of the apparatus where they join similar webs such as 47', for a positive retention of the side skirts such as 23 or 23' whilst preventing their being thrown outwards under the pressure of the cushion. As the space defined by the flexible inner skirt, by the inner suspension walls 29 and 29' and by the transverse suspension wall 36 which connects them together, constitutes a single inner cushion, the webs are of triangular shape to free the centre of the said inner cushion and possibly reduce the drag from waves.

The same retaining effect may be completed in the plane of the movable plates and of the fabric 31 by another flexible fabric 37 with through orifices such as 38 for supplying the said inner cushion with air.

According to another embodiment represented in part of FIG. 6, the transverse partitions have the shape of a truncated prism of triangular base the truncated prism being disposed so that the triangular bases are carried by the peripheral skirts 22 (22') and inner skirts 23 (23'), the rear side 53 of the 66artition, with respect to the direction of movement D of the vehicle, being substantially vertical and the forward side 54 being inclined.

The webs are also made in the form of volumes, as FIG. 6 shows, and are in the shape of a pyramid with a triangular base, the triangular base being carried by the skirt 23 (23'), the rear side 55 of the partition, with respect to the direction of movement D of the vehicle, being substantially vertical and the forward side 56 being inclined.

In FIGS. 2 and 6 the partitions and the webs and particularly their rear sides 53 and 55 are extensions of one another and are presented in the form of volumes previously described, however this arrangement in not imperative and partitions of different types may coexist in one and the same vehicle, as may webs or a combination of two types of partitions and webs.

Webs solely in the form of volumes previously defined may equip a vehicle comprising only a single peripheral skirt.

Between the rigid flooring 3 of the structure and the fabrics 31 and possibly 37, the fairing of the fan is extended by a distribution box 39 of flexible fabric provided with orifices 40 towards the rear and/or 41 towards the bottom so as to supply the inner cushion directly or indirectly and other orifices 42 towards the front for supplying the prow cushion between the prow skirts 34 and 35 as well as the side cushions between the side skirts 22, 23 and 22' and 23', the movable plates being provided with small apertures such as 43 for this purpose.

The transverse wall 36 is connected to the distribution box 39 between the two groups of orifices 40 and 42, which ensures the independence of the pressures in the central cushion and in the others necessary for the stability of the vehicle against pitching.

A central partition may also be arranged between the distribution box, the prow wall, the fabric 31 and the flooring 3 so as to ensure the independence of the pressures in the side cushions and improve the stability against rolling.

Furthermore, dampers or shutters may be provided for controlling the flow at different points in the air suspension and distribution space which the flooring on the one hand, the plates and the fabrics 31 on the other hand define, so as to adjust the attitude of the vehicle. This improvement is not necessary for the stability of the apparatus because the side cushions, normally supplied by leakage from the inner cushion, receive an additional supply through the openings 43, which is sufficient to prevent engagement in the case where their side is deposited. However, it enables the pilot to control the attitude.

It will be noted that the prow skirts are inclined the same as the transverse partitions 25 and for the same purpose. Only the rear transverse skirt 24 can remain substantially vertical, since the rear articulation for the plates to which it is fixed permits it to rise so as not to drag in the waves.

The lefthand portion of FIG. 3 shows a plate the outer edge 48 of which is raised or curved upwards so as to be lifted on encountering a wave; at the righthand portion, the plate is provided with a light or floating element 49, such as for example a block of expanded polystyrene, fixed to the plate and on which the flexible wall of the suspension is supported. Tests have shown that such devices prevent engagement during side slipping.

FIGS. 2 and 3 show a partition in the form of a keel 50 which is fixed to the webs such as 45 and 46 and possibly to the fabric 37 and which, for this reason, participates in the central movements of the suspension of the hovercraft whilst possibly ensuring its guide path. Its main purpose is to separate the inner cushion into two.

FIG. 4 shows a pneumatic arrangement for raising this keel consisting of one or a plurality of enclosures having flexible walls 51, 51' which connect it to the flooring. When air is removed by means of the conduit 52, which may be connected to the carburettor of one of the engines or to the suction from the fan, it tends to flatten and raise the keel. Other known means can be used in a similar manner.

In accordance with one embodiment of the invention, the movable plates carry skirts of unequal length such that the leakage gap between the ground and the bottom of the peripheral exterior of the skirt is less than the gap beneath the inner skirt. The effect of this is that the pressure in the corresponding cushion is a function of the leakage gap and thus of the air flow. The air escapes from the central volume by first of all passing beneath the inner skirt then beneath the peripheral skirt. The flow being the same beneath the two skirts, the pressure prevailing in the central volume being maintained constant, in the case of a variation in height of the plate above the ground, an automatic correction is produced tending to return the leakage gap to its initial value by lowering of the movable plate. In the constructed prototype, the leakage gap was 10 mm for the peripheral skirt and 20 mm for the inner skirt.

Although the embodiment described relates to a marine vehicle, the arrangement of skirts such as described is applicable without essential modification to a land vehicle. It goes without saying that in this case the rigid structure to which the air cushions are fixed will then be the rigid chassis of the vehicle.

I claim:

1. A vehicle supported by an air cushion extending beneath at least the greater part of the lower surface of the rigid structure of the vehicle, characterised in that, the said cushion is bounded on each side of the axis of the vehicle by two parallel skirts, a peripheral skirt and an inner skirt, inclined towards the inside of the vehicle defining between them a row of auxiliary air cushions separated by transverse partitions which form skirts at least in part inclined towards the rear with respect to the sense of movement of the vehicle, the bottoms of the auxiliary air cushions being formed by perforated plates articulated to one another, the edges of the said plates are connected to the rigid structure by flexible walls forming a flexible volume connected to the supply of air under pressure.

2. A vehicle according to claim 1 characterised in that the said perforated plates are flexible plates.

3. A vehicle according to claim 1 characterised in that the leakage gap beneath the inner skirt is wider than the leakage gap beneath the peripheral skirt.

4. A vehicle according to claim 1 characterised in that the inner skirt is supported by webs of triangular shape, the points of the webs being arranged towards the axis of symmetry of the vehicle so as to free the centre of the inner cushion, the said webs, at least in part, being inclined towards the rear.

5. A vehicle according to claim 4 characterised in that the said webs are in the shape of a pyramid having a triangular base, the triangular base being carried by the skirt, the rear side of the partition, with respect to the direction of movement of the vehicle, being substantially vertical and the forward side being inclined.

6. A vehicle according to claim 4 characterised in that the said edges of the plates are provided with floats.

7. A vehicle according to claim 1 characterised in that the outer edges of the plates are curved upwards.

8. A vehicle according to claim 7 characterised in that one partition in the form of a keel is fixed to the pointed ends of the webs separating the inner cushion into two parts.

9. A vehicle according to claim 8 characterised in that the keel is fixed to the flooring through the agency of a raising device.

10. A vehicle according to claim 1 characterised in that the said transverse partitions are shaped as a truncated prism having a triangular base, the truncated prism being arranged so that the triangular bases are supported by the peripheral and inner skirts, the rear side of the partition, with respect to the direction of movement of the vehicle, being substantially vertical and the forward side being inclined.

* * * * *